United States Patent
Knoll et al.

(10) Patent No.: US 6,916,879 B2
(45) Date of Patent: Jul. 12, 2005

(54) CORE-HYDROGENATED BLOCK COPOLYMERS HAVING AN ASYMMETRIC STRUCTURE

(75) Inventors: Konrad Knoll, Ludwigshafen (DE); Arnd Böttcher, Frankenthal (DE); Michael Ishaque, Mannheim (DE); Friederike Osswald, Mannheim (DE); Jan-Dirk Arndt, Mannheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/477,467

(22) PCT Filed: May 14, 2002

(86) PCT No.: PCT/EP02/05260

§ 371 (c)(1),
(2), (4) Date: Nov. 12, 2003

(87) PCT Pub. No.: WO02/094899

PCT Pub. Date: Nov. 28, 2002

(65) Prior Publication Data

US 2004/0132943 A1 Jul. 8, 2004

(30) Foreign Application Priority Data

May 18, 2001 (DE) .......................................... 101 24 254

(51) Int. Cl.$^7$ ............................................. C08F 297/04
(52) U.S. Cl. ........................ 525/89; 525/314; 525/316; 525/338
(58) Field of Search ........................ 525/89, 314, 316, 525/338

(56) References Cited

U.S. PATENT DOCUMENTS

| | | | |
|---|---|---|---|
| 3,333,024 A | 7/1967 | Haefele et al. | |
| 3,431,323 A | 3/1969 | Jones | |
| 3,598,886 A | 8/1971 | Hoeg et al. | |
| 4,882,384 A | 11/1989 | Willis et al. | |
| 5,296,547 A | * 3/1994 | Nestegard et al. | .......... 525/314 |

FOREIGN PATENT DOCUMENTS

| | | |
|---|---|---|
| WO | 94/21694 | 9/1994 |
| WO | 96/34896 | 11/1996 |
| WO | 00/32646 | 6/2000 |
| WO | 00/56783 | 9/2000 |
| WO | 00/77054 | 12/2000 |
| WO | 01/12681 | 2/2001 |
| WO | 01/23437 | 4/2001 |

* cited by examiner

*Primary Examiner*—James J. Seidleck
*Assistant Examiner*—Olga Asinovsky
(74) *Attorney, Agent, or Firm*—Novak Druce & Quigg, LLP

(57) ABSTRACT

The invention relates to core-hydrogenated block copolymers composed of vinyl aromatic monomers and dienes having at least two blocks S, which are of different molecular weights and ate comprised of vinyl aromatic monomers. The invention also relates to mixtures containing core-hydrogenated polysterene and to methods for the production thereof.

11 Claims, No Drawings

CORE-HYDROGENATED BLOCK COPOLYMERS HAVING AN ASYMMETRIC STRUCTURE

The invention relates to ring-hydrogenated block copolymers composed of vinylaromatic monomers and dienes, to a process for their production, and also to mixtures with ring-hydrogenated polystyrene.

Styrene-butadiene block copolymers and styrene-isoprene block copolymers may be hydrogenated to give polymers with different properties, for example with improved aging resistance or improved weathering resistance. Depending on the hydrogenation conditions used, the olefinic double bonds may be selectively hydrogenated here (U.S. Pat. No. 4,882,384), or else both the olefinic and the aromatic double bonds may be hydrogenated (U.S. Pat. No. 3,333,024, U.S. Pat. No. 3,431,323, U.S. Pat. No. 3,598,886).

WO 94/21694 describes by way of example the hydrogenation of polystyrene or styrene-butadiene block copolymers, or styrene-isoprene block copolymers, on supported metal catalysts. Under the conditions of the reaction, not only the diene block but also the phenyl groups of the polystyrene block are hydrogenated. The polystyrene block therefore gives rise to a polyvinylcyclohexane (PVCH) block.

WO 96/34896 describes an improved hydrogenation catalyst for the ring-hydrogenation of styrene polymers. The starting material described in that specification for the ring-hydrogenation is not only polystyrene but also styrene-butadiene two- and three-block polymers, and styrene-isoprene two- and three-block polymers. The hydrogenation of styrene-butadiene block copolymers having 3 and 5 blocks, and of styrene-isoprene block copolymers having 3 and 5 blocks, has also been described (WO 00/32646, WO 00/56783, WO 01/12681), as has the hydrogenation of styrene-butadiene star-block copolymers (WO 01/23437).

EP-A 505 110 discloses hydrogenated mixtures composed of styrene-butadiene block copolymers and polystyrene for optical storage media.

It is an object of the present invention to provide ring-hydrogenated block copolymers which, especially in a blend with ring-hydrogenated polystyrene, not only have a very good toughness/stiffness ratio and excellent transparency, but also have high heat resistance. They should also have good compatibility with hydrogenated polystyrene, and therefore be capable of giving homogeneous mixtures with excellent transparency.

We have found that this object is achieved by way of ring-hydrogenated block copolymers composed of vinylaromatic monomers and dienes, where the block copolymers have at least two S blocks with differing molar mass composed of vinylaromatic monomers.

The ring-hydrogenated block copolymers preferably contain an $S_1$ block whose molar mass $M_n$ is at least 30 000 g/mol, and preferably contain an $S_2$ block whose molar mass $M_n$ is in the range from 5 000 to 25 000 g/mol. The $S_1$ block particularly preferably has a molar mass $M_n$ in the range from 30 000 to 100 000 g/mol, and the $S_2$ block particularly preferably has a molar mass $M_n$ in the range from 10 000 to 25 000 g/mol.

The degree of hydrogenation of the olefinic double bonds is generally 97% or higher, and the degree of hydrogenation of the vinylaromatic monomers is preferably at least 90%, particularly preferably at least 95%, in particular 98%.

Preference is also given to ring-hydrogenated block copolymers in which the proportion of the diene units prior to the hydrogenation process is at most 50% by weight, based on the entire block copolymer.

Prior to the hydrogenation process, it is preferable that more than 30%, with preference from 35 to 50%, of the copolymerized diene units, based on the entirety of the diene units, are present in the 1,2-vinyl form.

Examples of vinylaromatic monomers which may be used are styrene, alpha-methylstyrene, ring-alkylated styrenes, such as p-methylstyrene and tert-butylstyrene, and 1,1-diphenylethylene, and mixtures of these.

Preferred dienes are butadiene, isoprene, 2,3-dimethylbutadiene, 1,3-pentadiene, 1,3-hexadiene, and piperylene, and mixtures of these; butadiene and isoprene are particularly preferred.

Besides the S blocks composed of vinylaromatic monomers, the block copolymers may have, prior to the hydrogenation process, a pure diene B block, or an S/B copolymer block composed of vinylaromatic monomers and dienes. The copolymer block may have random distribution or have a monomer gradient.

The block copolymers may be prepared by known sequential anionic polymerization of the vinylaromatic monomers and dienes in hydrocarbons, preferably cycloaliphatics, such as cyclohexane, methylcyclohexane, or cyclopentane, or benzene. Cyclohexane is particularly preferred. The usual method for this uses an organolithium initiator, such as n-butyllithium or sec-butyllithium, etc.

The polymerization may be terminated using a protic terminator, for example water, alcohols, such as methanol or ethanol, carbon dioxide, or a coupling agent. To prepare star-block copolymers, the functionality of the coupling agent is preferably from 3 to 5. Examples here are epoxidized fatty esters, such as epoxidized linseed oil, or epoxidized soybean oil.

The proportion of the copolymerized diene units present in the 1,2-vinyl form may be generated via the addition of substances with permanent properties, for example ethers or amines.

For this purpose, preference is given to tetrahydrofuran, dimethoxyethane, or 2-alkyl furfuryl ethers, in amounts of from 0.1 to 1% by volume, in particular from 0.25 to 0.5% by volume, based on the hydrocarbon, e.g. cyclohexane, used as solvent.

The presence of these substances, or of potassium salts, such as potassium alkoxides of tertiary alcohols having at least 7 carbon atoms, acting as a randomizer, can also show the extent of random distribution of the vinylaromatic monomers and dienes in the S/B copolymer blocks.

After the preparation of the block copolymer, the unsaturated bonds in the diene units, and also in the vinylaromatic units of the block copolymer, are hydrogenated, using a hydrogenation catalyst. Preference is given to the use of supported hydrogenation catalysts. Examples of suitable support material are inorganic substrates, such as barium sulfate, silicates, carbon, or aluminum oxides. Examples of suitable hydrogenation metals are nickel, cobalt, rhodium, ruthenium, palladium, platinum, and other group 8 metals.

The hydrogenation preferably takes place in a saturated hydrocarbon solvent in which the block copolymer is soluble. Cycloaliphatic hydrocarbons are preferred, in particular cyclohexane. It is advisable for the solvent used to be the same as that used during the polymerization, so that the hydrogenation can take place in a step which follows the polymerization. The hydrogenation may take place batchwise or continuously, preference being given to continuous hydrogenation on a fixed-bed catalyst.

The hydrogenation generally takes place at temperatures in the range from 40° C. to 250° C., particularly preferably in the range from 120° C. to 180° C. The hydrogenation may be carried out at from atmospheric pressure to 350 bar, preferably in the range from 100 to 250 bar.

The block copolymers may have a linear or star structure. The molar mass $M_n$ of the entire block copolymer is generally in the range from 50 000 to 300 000 g/mol, preferably in the range from 80 000 to 250 000 g/mol.

Preferred structures for the linear block copolymers are S-B-S/B-S, $S_1$-B-S/B-$S_2$, $S_1$-B-$S_2$, $S_1$-(S/B)$_1$-(S/B)$_2$-$S_2$, and $S_1$-(S/B)-B-$S_2$. The star structures $S_1$-B-X-B-$S_2$, $S_1$-(S/B)-B-X-B-(S/B)-$S_2$, and $S_1$-(S/B)$_1$-(S/B)$_2$-X-(S/B)$_2$-(S/B)$_1$-$S_2$, are likewise preferred, S being a vinylaromatic polymer block, B being a diene block, S/B being a copolymer block composed of vinylaromatic monomers and diene, preferably with random distribution of the monomers, and X being an oligofunctional coupling agent, and the indices 1 and 2 indicating blocks with differing molar mass or with differing monomer make-up.

An example of a way of preparing the star-block copolymers adds initiator on two or more occasions, and adds vinylaromatic monomers simultaneously or in immediate succession. The initiator ratio for the individual additons of initiator depends on the desired ratio of the individual arms of the star. If there are two occasions of initiation, the initiator ratio $I_1/I_2$ selected is preferably in the range from 0.1 to 1, in particular in the range from 0.2 to 0.8.

The amount of vinylaromatic monomers added together with the initiator determines the molar mass $M_n$ of the terminal blocks, e.g. $S_1$ and $S_2$.

The subsequent additions of monomers, monomer mixtures, or coupling agent generally take place after complete conversion of the prior addition. Typical addition sequences for the initiators I, the vinylaromatic monomers S, the dienes B, and the coupling agents CA are given in table 1, as are the resultant structures.

In the star 5, or further additions of vinylaromatic monomer S and of dienes B may take place individually or together, instead of the addition sequence 4.

EXAMPLES

The polybutadiene content of the block copolymers was determined by means of IR spectroscopy.

The number-average molar mass $M_n$ and the polydispersity PDI were determined by means of gel permeation chromatography (GPC) relative to polystyrene standards.

The degree of hydrogenation of the aromatic unsaturated bonds was determined by comparing the UV signal intensities in the GPC plots of specimens prior to and after the hydrogenation process. The degree of hydrogenation of the double bonds in the diene units was above 99% in all of the examples.

Molar mass degradation was determined by comparing the RI signal intensities in the GPC plots of specimens prior to and after the hydrogenation process.

Prior to and after the hydrogenation process, the block copolymers have two glass-transition-temperature-related transitions $T_g$ for the soft and hard phase, these being determined by DSC measurements in the range from –100° C. to 230° C.

The hydrogenated block copolymers were melted at 200° C. at a pressure of 200 bar, and pressed to give plaques, from which tensile test specimens were obtained.

Secant modulus, tensile strength, and tensile strain at break were determined on tensile test specimens (type 4 small specimens, ISO 8256), the method being based on ISO 527-2.

Softening point (Vicat B) was determined to ISO 306 (1994), and Shore D hardness was determined to DIN 53505.

The transmittance values were determined on pressed plaques of thickness 1 mm.

TABLE 1

| Addition sequence | Star 1 | Star 2 | Star 3 | Star 4 | Star 5 | Star 6 |
|---|---|---|---|---|---|---|
| 1 | I and S | I and S | I and S | I and S | I and S | I and S |
| 2 | I and S | I and S | I and S | I and S | I and S | I and S |
| 3 | B | S and B | S and B | S and B | I and S | B |
| 4 | CA | CA | B | S and B | B | S |
| 5 | | | CA | CA | CA | CA |
| resultant structure | $S_1$—B——$X$$S_2$—B—— | $S_1$—(S/B)——$X$$S_1$—(S/B)—— | $S_1$—(S/B)—B——$X$$S_2$—(S/B)—B—— | $S_1$—(S/B)$_1$—(S/B)$_2$——$X$$S_2$—(S/B)$_1$—(S/B)$_2$—— | $S_1$—B——$X$$S_2$—B——$S_3$—B—— X | $S_1$—B—$S_3$——$X$$S_2$—B—$S_3$—— |

The invention also provides mixtures of ring-hydrogenated block copolymers with ring-hydrogenated polyvinylaromatics, preferably polystyrene. Preference is given to mixtures which comprise from 10 to 90% by weight of the ring-hydrogenated block copolymers and from 90 to 10% by weight of ring-hydrogenated polystyrene. Examples of ways of preparing these mixtures involve mixing of the ring-hydrogenated block copolymers and of the ring-hydrogenated polystyrene in suitable mixing assemblies, such as extruders or static mixers, or ring-hydrogenation of a mixture of S/B block copolymer with GPPS.

The inventive ring-hydrogenated block copolymers and mixtures with ring-hydrogenated polystyrene are suitable for any of the applications where polycarbonate is usually used, for example for producing optical storage media.

The inventive ring-hydrogenated block copolymers have a good toughness/stiffness ratio together with high heat resistance, and moreover have a good miscibility with ring-hydrogenated polystyrene (polyvinylcyclohexane). These mixtures have excellent transparency together with outstanding toughness/stiffness ratio.

Examples 1–6

Linear Styrene-butadiene Block Copolymers

The asymmetric linear block copolymers shown in table 2 were synthesized in a 10 l stirred vessel, using standard inertization techniques. First, 4 790 ml of dry cyclohexane formed an initial charge in the vessel and were heated to 50° C. A precalculated amount of sec-butyllithium (1.5 mol/l) and tetrahydrofuran (0.4% by volume, based on the amount of cyclohexane) were added, and then the solution was stirred for a further 5 minutes. The following materials were added in succession to the reaction solution: portions of anhydrous styrene and butadiene to build up the blocks, and anhydrous styrene simultaneously with butadiene to build up a copolymer block. The reaction time here to build up a styrene block was 15 minutes, while that for a butadiene block, and also for a styrene-butadiene copolymer block, was 40 minutes. The polymerization was terminated by adding 3 ml of isopropanol. 0.1% (based on the solids content of the block copolymer) of Kerobit TBK (2,6-di-tert-butyl-p-kresol) was added to stabilize the material.

TABLE 2

| Ex | Block structure | $S_1$ [g] | $S_2$ [g] | $B_1$ [g] | $(S/B)_1$ [g] | $(S/B)_2$ [g] | sec-BuLi 1.5 mol/l [mL] | Butadiene content[1] [%] | Proportion of 1,2-linkage in polybutadiene block[1] [%] | $M_{n2}$ | PDI[2] | $Tg^3$ [° C.] |
|---|---|---|---|---|---|---|---|---|---|---|---|---|
| 1 | $S_1$—$B_1$—$(S/B)_1$—$S_1$ | each 497 | — | 313 | 159/90 | — | 6.6 | 23 | 50 | 174 000 | 1.17 | −57/96 |
| 2 | $S_1$—$B_1$—$(S/B)_1$—$S_2$ | 704 | 230 | 346 | 179/92 | — | 8.5 | 27 | 47 | 127 000 | 1.15 | −57/96 |
| 3 | $S_1$—$B_1$—$S_2$ | 830 | 415 | 284 | — | — | 7.9 | 14 | 57 | 151 000 | 1.18 | −54/98 |
| 4 | $S_1$—$B_1$—$S_2$ | 914 | 343 | 309 | — | — | 15.2 | 17 | 51 | 81 000 | 1.11 | −72/98 |
| 5 | $S_1$—$(S/B)_1$—$(S/B)_2$—$S_2$ | 725 | 235 | — | 165/74 | 118/265 | 7.8 | 20 | 46 | 132 000 | 1.15 | −38/96 |
| 6 | $S_1$—$B_1$—$(S/B)_1$—$S_2$ | 707 | 204 | 293 | 258/139 | — | 8.6 | 27 | 42 | 147 000 | 1.10 | −50/102 |

Examples 7–12
Styrene-butadiene Star-block Copolymers

The asymmetric star-block copolymers shown in tables 3 and 4 were synthesized in a 10 l stirred vessel, under inert conditions, by adding 4 790 ml of dry cyclohexane as an initial charge to the vessel and heating to 50° C. A precalculated amount of sec-butyllithium (1.5 mol/l) and 0.4% by volume tetrahydrofuran were added, and then the reaction solution was stirred for a further 5 minutes.

After the first addition of a precalculated amount of anhydrous styrene to build up the $S_1$ block, and 15 minutes of reaction time, further initiator solution (sec-butyllithium) was added to initiate further chains. Further blocks are built up by adding portions of anhydrous styrene and butadiene, and by simultaneous addition of anhydrous styrene and butadiene to build up a copolymer block. The reaction time to build up a styrene block was 15 minutes, and that for a butadiene block, and also that for a styrene-butadiene copolymer block, was 40 minutes. The copolymer blocks were coupled by adding Endenol D 82 (Henkel KGaA, 40% solution in toluene) at 50° C. within a period of 15 minutes, to give the star-block copolymer. 0.1% (based on the solids content of the star-block copolymer) of Kerobit TBK (2,6-di-tert-butyl-p-kresol) was added to stabilize the material.

TABLE 4

| Ex. | $S_1$ [g] | $S_2$ [g] | $B_1$ [g] | $S_3$ [g] | $(S/B)_1$ [g] | $(S/B)_2$ [g] | sec-BuLi 1 1.5 mol/l [mL] | sec-BuLi 2 1.5 mol/l [mL] |
|---|---|---|---|---|---|---|---|---|
| 7 | 492 | 443 | 619 | — | — | — | 5.1 | 17.9 |
| 8 | 492 | 443 | 533 | 246 | — | — | 5.1 | 17.9 |
| 9 | 372 | 335 | 357 | — | 279/151 | — | 4.1 | 14.5 |
| 10 | 500 | 300 | 400 | — | 225/150 | — | 9.2 | 9.2 |
| 11 | 329 | 311 | — | — | 243/124 | 195/399 | 4.4 | 15.6 |
| 12 | 460 | 414 | — | — | 242/387 | — | 5.1 | 19.9 |

Examples 13–24

The results of the hydrogenation of the block copolymers from examples 1–12 are given in table 5.
Preparation of Hydrogenation Catalyst (5% of Pt on Activated Carbon)

2.09 kg (calculated dry weight) of activated carbon (Norit SX Plus) were slurried, with stirring, in 16.72 kg of deionized water. To this mixture was added a solution of 0.1864 kg of Pt(II) nitrate, comprising 0.110 kg of Pt, in 2.140 kg of deionized water. The suspension was heated to 50° C., while stirring. To reduce the platinum, 3.136 l of a 5% strength hydrazine hydrate solution were then added, and the mixture was then stirred at 50° C. for a further 30 min. It was

TABLE 3

| Ex. | Block structure | Initiator ratio | Butadiene content [%] | Proportion of 1,2-linkage in polybutadiene [%] | $M_n$ | PDI | Tg [° C.] |
|---|---|---|---|---|---|---|---|
| 7 | $S_1$—$S_2$—$B_1$—X—$B_1$—$S_2$ | 1:3.5 | 39 | 41 | 79 500 | 1.88 | −69/91 |
| 8 | $S_1$—$S_2$—$B_1$—$S_3$—X—$S_3$—$B_1$—$S_2$ | 1:3.5 | 32 | 36 | 88 600 | 1.90 | −60/88 |
| 9 | $S_1$—$S_2$—$(S/B)_1$—$B_1$—X—$B_1$—$(S/B)_1$—$S_2$ | 1:3.5 | 37 | 41 | 124 000 | 2.01 | −68/72 |
| 10 | $S_1$—$S_2$—$(S/B)_1$—$B_1$—X—$B_1$—$(S/B)_1$—$S_2$ | 1:1 | 36 | 41 | 155 100 | 1.87 | −65/91 |
| 11 | $S_1$—$S_2$—$(S/B)_1$—$(S/B)_2$—X—$(S/B)_2$—$(S/B)_1$—$S_2$ | 1:3.5 | 36 | 37 | 123 800 | 2.00 | −33/72 |
| 12 | $S_1$—$S_2$—$(S/B)_1$—X—$(S/B)_1$—$S_2$ | 1:1 | 26 | 36 | 82 600 | 1.86 | −32/103 | then cooled, filtered, and washed with water until free from nitrate (conductivity>20 μS). The catalyst was then dried in a vacuum drying cabinet for 54 h at 110° C.

Method Using 20 l Autoclave (Hydrogenation Condition A)

13.3 l of a 5% strength polymer solution in cyclohexane were charged to the autoclave. 135 g of the catalyst (5% Pt/C hydrogenation catalyst) were carefully added. After a pressure check, hydrogen was first introduced under pressure until the pressure was 50 bar, and the temperature was increased to 220° C. The hydrogen pressure was then adjusted in stages up to 250 bar. The hydrogenation time of 48 hours starts once the operating pressure has been achieved. Any fall in pressure during this period is corrected by introducing further hydrogen under pressure. Once the hydrogenation time had ended, the suspension was discharged, using superatmospheric pressure. The catalyst was removed by filtration, using a pressure-filtration funnel.

Method Using 5 l Autoclave (Hydrogenation Condition B)

3.3 l of a 6% strength polymer solution (3% in example 21) in cyclohexane were charged to the respective autoclaves. 41 g of the hydrogenation catalyst (5% Pt/C) were carefully added. After a pressure check, hydrogen was first introduced under pressure until the pressure was 50 bar, and the temperature was increased to 220° C. The hydrogen pressure was then adjusted in stages up to 250 bar. The hydrogenation time of 48 hours starts once the operating pressure has been achieved. Any fall in pressure during this period is corrected by introducing further hydrogen under pressure. Once the hydrogenation time has ended, the suspension is removed from the pressure vessel. The catalyst was removed by filtration, using a pressure-filtration funnel.

TABLE 6

| Ex. | Block co-polymer from Ex. | PCHE addition [%] | Secant modulus [GPa] | Tensile strength [MPa] | Tensile strain at break [%] | Tg (DSC) [° C.] | Transmitance[3] [%] |
|---|---|---|---|---|---|---|---|
| 25 | 14 | 10 | 0.94 | 29.5 | 11 | 140 | >87.6 |
| 26 | 14 | 17 | 0.95 | 29.0 | 8 | 141 | >87.0 |
| 27 | 15 | 10 | 1.18 | 32.2 | 4 | 141 | >90.2 |
| 28 | 15 | 17 | 1.25 | 32.7 | 4 | 138 | >90.3 |
| 29 | 15 | 50 | 1.54 | — | 2 | — | >91.1 |
| 30 | 17 | 10 | 0.96 | 32.9 | 5 | 139 | >88.1 |
| 31 | 17 | 17 | 1.01 | 33.8 | 6 | 142 | >88.7 |
| 32 | 17 | 50 | 1.40 | — | 3 | 142 | >88.2 |
| 33 | 18 | 10 | 0.84 | 26.2 | 95 | 143 | >91.4 |
| 34 | 18 | 17 | 0.95 | 29.4 | 27 | 142 | >91.0 |
| 35 | 18 | 50 | 1.20 | — | 6 | 144 | >89.2 |
| 36 | 20 | 10 | 0.62 | 17.3 | 232 | 139 | >90.3 |
| 37 | 20 | 17 | 0.75 | 19.8 | 201 | 140 | >89.3 |
| 38 | 20 | 50 | 1.11 | — | 29.8 | 146 | >85.6 |
| 39 | 23 | 10 | 0.03 | — | 550 | 140 | >89.8 |
| 40 | 23 | 17 | 0.03 | — | 440 | 142 | >89.5 |
| 41 | 23 | 50 | 0.36 | — | 77 | 142 | >84.7 |

We claim:

1. A ring-hydrogenated block copolymer made from vinylaromatic monomers and from dienes, which has at least two blocks S made from vinylaromatic monomers, and which has a block $S_1$ with a molar Mass $M_n$ of at least 30 000 g/mol and a block $S_2$ with a molar mass $M_n$ in the range from 5 000 to 25 000 g/mol.

2. A ring-hydrogenated block copolymer as claimed in claim 1, which has a block $S_1$ with a molar mass $M_n$ in the

TABLE 5

| Ex. | Block co-polymer from Ex. | Degree of hydrogenation (aromatic bonds) [%] | Molar mass degradation [%] | Secant modulus [GPa] | Tensile strength [MPa] | Tensile strain at break [%] | Tg [° C.] | Vicat B [° C.] | Shore D hardness | Transmitance [%] | Hydrogenation condition |
|---|---|---|---|---|---|---|---|---|---|---|---|
| 13 | 1 | 99.6 | 0.5 | 0.84 | 30.1 | 6.3 | −58/123 | 109 | — | >91.6 | B |
| 14 | 2 | 99.7 | 0.0 | 0.84 | 28.7 | 18.7 | −55/127 | 91 | 74 | >91.6 | A |
| 15 | 3 | 99.4 | 0.0 | 1.33 | 33.2 | 5.2 | −63/140 | 115 | 66 | >92.2 | B |
| 16 | 4 | 99.6 | 0.0 | 1.28 | 32.3 | 6.0 | −57/130 | 109 | 80 | >91.7 | B |
| 17 | 5 | 99.4 | 1.2 | | | | −43/127 | 93 | — | >91.0 | B |
| 18 | 6 | 99.9 | 0.0 | 0.69 | 23.6 | 105.5 | −50/133 | 88 | 68 | >91.6 | A |
| 19 | 7 | 98.9 | 0.0 | 0.52 | 16.8 | 157 | −56/120 | 80 | 70 | >89.9 | A |
| 20 | 8 | 99.7 | 5.1 | 0.56 | 33.1 | 165 | −54/124 | 83 | — | >92 | B |
| 21 | 9 | 99.6 | 3.9 | — | — | — | | | | — | A |
| 22 | 10 | 99.2 | 0.0 | 0.48 | 16.3 | 390 | −50/129 | 57 | — | >88.9 | B |
| 23 | 11 | 99.0 | 7.8 | — | 0.7 | 615 | −31/107 | — | — | >89.7 | A |
| 24 | 12 | 99.4 | 7.0 | — | | | −32/130 | 115 | — | >90.9 | A |

Examples 25–41

Blends of Polycyclohexylethane with the Hydrogenated Block Copolymers of Examples 14–23

To prepare mixtures from ring-hydrogenated block copolymers, 2 g (10% by weight), 3.4 g (17% by weight), and, respectively, 10 g (50% by weight) of polycyclohexylethane (PCHE) obtained from PS 158 K polystyrene from BASF AG, using hydrogenation condition B, were dissolved in 200 ml of cyclohexane with 18 g, 16.6 g, and, respectively, 10 g of ring-hydrogenated copolymer from examples 14–23, and stirred at room temperature. The solvent was then completely removed in vacuo at 80° C., and the mixtures were processed to give pressed plaques. The results are given in table 5.

range from 30000 g/mol to 100 000 g/mol and a block $S_2$ with a molar mass $M_n$ in the range from 10 000 to 25 000 g/mol.

3. A ring-hydrogenated block copolymer as claimed in claim 1, wherein the degree of hydrogenation of the vinylaromatic monomer units is at least 90%.

4. A ring-hydrogenated block copolymer as claimed in claim 1, wherein the proportion of the diene units prior to hydrogenation is not more than 50% by weight, based on the entire block copolymer.

5. A ring-hydrogenated block copolymer as claimed in claim 1, wherein prior to hydrogenation more than 30% of the copolymerized diene units, based on the total of the diene units, are present in the 1,2-vinyl form.

6. A ring-hydrogenated block copolymer as claimed in claim 1, which prior to hydrogenation has a copolymer block (S/B) made from vinylaromatic monomers and from dienes with random distribution.

7. A ring-hydrogenated block copolymer as claimed in claim 1, which is composed of styrene as vinylaromatic monomer and butadiene or isoprene as diene.

8. A mixture comprising
  a) from 10 to 90% by weight of ring-hydrogenated block copolymers as claimed in claim 1, and
  b) from 90 to 10% by weight of ring-hydrogenated polystyrene.

9. A process for preparing ring-hydrogenated block copolymers as claimed in claim 1, encompassing the steps of:

a) sequential anionic polymerization of the vinylaromatic monomers and dienes, using an organolithium initiator,
  b) terminating the polymerization by using a protic terminator or a coupling agent, and
  c) hydrogenating the resultant block copolymers, using a hydrogenation catalyst.

10. A process as claimed in claim 9, wherein step a) is carried out in a cycloaliphatic hydrocarbon as solvent, and in the presence of from 0.3 to 0.5 percent by volume, based on the solvent, of an ether.

11. Optical media comprising the block copolymer as claimed in claim 1.

* * * * *

UNITED STATES PATENT AND TRADEMARK OFFICE
CERTIFICATE OF CORRECTION

PATENT NO.       : 6,916,879 B2
APPLICATION NO. : 10/477467
DATED            : July 12, 2005
INVENTOR(S)      : Knoll et al.

It is certified that error appears in the above-identified patent and that said Letters Patent is hereby corrected as shown below:

In the 4th line of the abstract, please delete:
  "weights and ate comprised of vinyl aromatic monomers."
and substitute therefore:
  --weights and are comprised of vinyl aromatic monomers.--

In claim 9, column 10, line 8, please delete:
  "carried out in a cycloaliphatic hydrocarbon as solvent, and"
and substitute therefore:
  --carried out in a cycloaliphatic hydrocarbon as solvent, and--

Signed and Sealed this

Twenty-fifth Day of July, 2006

JON W. DUDAS
*Director of the United States Patent and Trademark Office*